United States Patent [19]

Kappenhagen

[11] 3,875,460

[45] Apr. 1, 1975

[54] SYNTHESIS OF DIMMER OUTPUT WAVEFORM WITHIN THE DIMMER LOGIC CIRCUIT

[75] Inventor: George A. Kappenhagen, Mechanicsburg, Pa.

[73] Assignee: Westinghouse Electric Corporation, Pittsburgh, Pa.

[22] Filed: June 10, 1974

[21] Appl. No.: 478,138

[52] U.S. Cl.............. 315/291, 315/194, 315/307, 315/DIG. 4
[51] Int. Cl.......................... H05b 41/16, G05f 1/08
[58] Field of Search........ 315/194, 199, 200 R, 208, 315/209 R, 291, 307, 324, DIG. 4

[56] References Cited
UNITED STATES PATENTS

| | | | |
|---|---|---|---|
| 3,419,753 | 12/1968 | Schultz et al. | 315/194 |
| 3,525,015 | 8/1970 | Kita | 315/194 |
| 3,684,919 | 8/1972 | Cramer | 315/194 |
| 3,821,601 | 6/1974 | Kappenhagen et al. | 315/291 X |
| 3,835,349 | 9/1974 | Yancey | 315/194 |

*Primary Examiner*—Rudolph V. Rolinec
*Assistant Examiner*—E. R. LaRoche
*Attorney, Agent, or Firm*—R. A. Stoltz

[57] ABSTRACT

An internally regulated lighting control apparatus (dimmer) responsive to an electrical demand signal to control the voltage supplied to a lamp load. This apparatus uses an output synthesis circuit which generates a signal essentially proportional to and of the same waveshape as the voltage across the load, thus providing a feedback signal without a feedback transformer.

5 Claims, 3 Drawing Figures

SYNTHESIS OF DIMMER OUTPUT WAVEFORM WITHIN THE DIMMER LOGIC CIRCUIT

CROSS-REFERENCE TO RELATED APPLICATION

In copending application Ser. No. 478,137, filed by the same inventor and owned by the same assignee, there is described a dimmer utilizing a pulse enable circuit and a single pulse per half cycle firing circuit for use with the discharge lamp load. As the lamp-ballast combination is an inductive load, a single pulse of firing circuit whose timing is based on the voltage cycle could generate the firing pulse after the voltage of the power source has gone through zero but while lagging current is still flowing and the solid-state switching means is still in a conductive state. Such a firing pulse would be ineffective and power would not be supplied to the load for the half cycle. This is avoided by the use of the pulse enable circuit which delays the firing pulse until the solid-state switching means is no longer conductive.

BACKGROUND OF THE INVENTION

The instant invention relates to lighting systems which control the illumination of one or more lamps, such as in a stage lighting system and more particularly to electronic dimmers which control the flow of power to the lamp load in response to an electrical demand signal.

Electronic dimmers are generally either regulated or non-regulated. While both types of dimmers generally control the portion of AC power supply cycle during which the solid-state switching means (typically either a pair of SCR's or a single triac) conduct, the non-regulated type has a fixed relationship between the electrical demand signal and the portion of the cycle during which power is supplied to the load and does not compensate for variations in line voltage. A regulated type of dimmer senses some load parameter (typically voltage across the load), compares this parameter (generally in full-wave rectified form) with the demand signal, and thus it takes into account of variations in line voltage. As the waveform being supplied to the load is a chopped sign wave, neither peak nor average voltage is an appropriate measure of the power in the load, and thus to maintain the same light intensity, the RMS value of the voltage across the load should be the feedback parameter (as described in patent application Ser. No. 370,134, filed June 13, 1973 by Kappenhagen and Tabor, now U.S. Pat. No. 3,821,601.

One method of obtaining a signal of the same waveshape and proportional to the voltage across the lamp load and having an appropriate reference potential is by means of a feedback transformer. Feedback transformers, however, are relatively heavy, bulky and expensive. Typically the control circuit uses a full-wave rectified signal, thus generally a rectifier bridge is also required in the feedback circuit.

SUMMARY OF THE INVENTION

It has been discovered that electronic circuitry can be used to replace the feedback transformer (and preferably the full-wave rectifier as well) in a regulated dimmer. An output synthesis circuit is used to produce a signal having the same waveshape (but preferably in rectified form) and proportional to the voltage across the load.

The lighting control apparatus (dimmer) of the instant invention is responsive to an electrical demand signal and controls the portion of the voltage cycle during which the voltage is supplied to a lamp load from an A.C. voltage source. The apparatus comprises a solid-state switching means, a firing means, a timing circuit, a comparator circuit, a shaping circuit, and an output synthesis circuit. The solid-state switching means is adapted to be connected in series with the load across the A.C. voltage source. The firing means has an output connected to the solid-state switching means and the firing means renders the solid-state switching means conductive when the firing means is initiated. The timing circuit is connected to the firing means and is capable of initiating said firing means. The comparator circuit has first and second inputs and an output connected to the timing circuit, the output signal of the comparator circuit being effective to adjust the timing circuit in response to the difference between the signals on the inputs of the comparator circuit. The shaping circuit has its output connected to the first input of the comparator circuit, the shaping circuit being adapted to receive the electrical demand signal and generate an output signal which is a function of the electrical demand signal. The output synthesis circuit has its output connected to the second input of the comparator circuit, and receives its first input from the output of the timing circuit and its second input from the A.C. voltage source (preferably through the rectifier bridge and transformer of the D.C. power supply). The output synthesis circuit is adapted to generate an output signal which is essentially zero during the portion of the voltage cycle which the timing circuit has not initiated the firing means and which is a function of the A.C. voltage source during that portion of the voltage cycle which the timing circuit has initiated the firing means.

BRIEF DESCRIPTION OF THE DRAWINGS

The invention can be best understood by reference to the following drawings in which.

DESCRIPTION OF THE PREFERRED EMBODIMENTS

Figure 1:
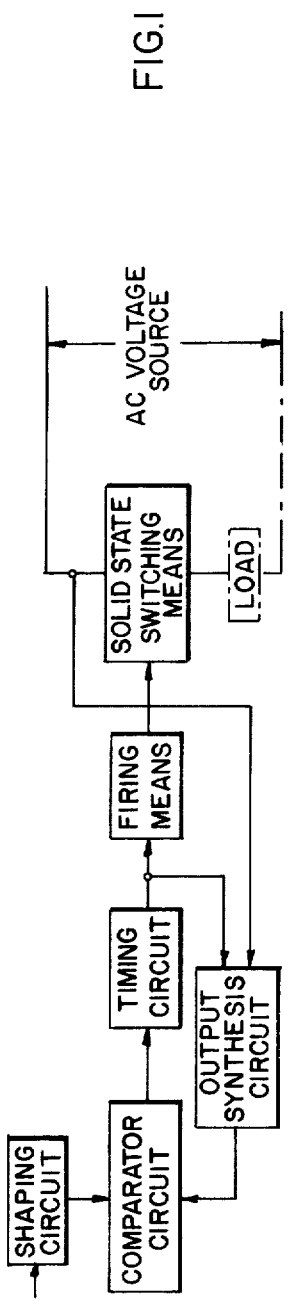
FIG. 1 is a block diagram showing the interrelationship between the essential elements of the instant invention.

The block diagram of FIG. 1 shows the basic elements of the lighting control apparatus using an output synthesis circuit. The shaping circuit receives an electrical demand signal and produces an output signal which is a function of this demand signal (the demand signal is typically a voltage directly proportional to the desired apparent light intensity and the shaped signal is preferably proportional to the RMS voltage across the load which will produce that light intensity). The comparator circuit compares the shaped demand signal with the feedback signal of the output synthesis circuit and adjusts the timing circuit to correct for any error. The timing circuit initiates the firing means at the appropriate time each half cycle which in turn renders the solid-state switching means conductive.

In an electronic dimmer, it is convenient to work with feedback signals which are full-wave rectified, rather than A.C. Thus a typical regulated circuit would use a feedback transformer which is connected across the load voltage and which feeds a signal into a full-wave rectifier. In the instant invention, the output synthesis circuit can conveniently obtain a voltage proportional to the A.C. voltage source in full-wave rectified form, in the dimmer power supply, (this voltage is available where the voltage has been rectified, but not yet filtered). The output of the timing circuit is used to modify this voltage waveshape and thus to produce a waveshape which is the same as that across the load (when full-wave rectified).

The output synthesis circuit can be used for either incandescent lamp dimmers or discharge lamp dimmers. It will be noted that, in the case of a voltage-controlled discharge lamp load, the voltage being controlled is actually the voltage across the ballast-lamp combination, rather than the voltage across the lamp itself. As the electronic dimmers are normally used to control more than one lamp and each lamp has its individual ballast, there is no common voltage across the discharge lamps to feed back for control purposes (further, the voltage across the discharge lamp is not directly proportional to load and thus is not a convenient feedback parameter). Thus, as a practical matter, the voltage across the ballast-lamp combination (or several ballast-lamp combinations in parallel) is used for control and a regulated (line voltage compensated) control is provided for the discharge lamp load.

Preferably the output synthesis circuit comprises an A.C. waveform coupler, a waveform switching means, and a timing signal coupler. The A.C. waveform coupler has input connected (directly or indirectly) to the A.C. voltage source and an output connected to a first input of the waveform switching means. The timing signal coupler input is connected to the output of the timing circuit and the timing signal coupler output is connected to the second input of the waveform switching means. The waveform switching means output is the output of the output synthesis circuit (and is therefore connected to the comparator circuit).

Preferably the A.C. waveform coupler is a resistor which is connected to an intermediate terminal of the D.C. power supply which has the rectified but unfiltered waveform which normally exists in the D.C. power supply. While the output synthesis could obtain a waveform proportional to line voltage elsewhere (for example from a resistor's divider across the A.C. voltage source or from the D.C. power supply transformer's secondary) such waveform would normally require rectification and thus the unfiltered-rectified waveform on the D.C. power supply is preferred. A D.C. power supply normally rectifies the A.C. voltage and produces an unfiltered-rectified waveform and the unfiltered-rectified waveform is then filtered and used to provide D.C. power for the lighting control apparatus. The output synthesis circuit preferably uses this unfiltered-rectified waveform (which is proportional to line voltage and thus essentially proportional in magnitude to voltage across the load) and modifies the waveform to be the same as the rectified load waveform.

Figure 2:
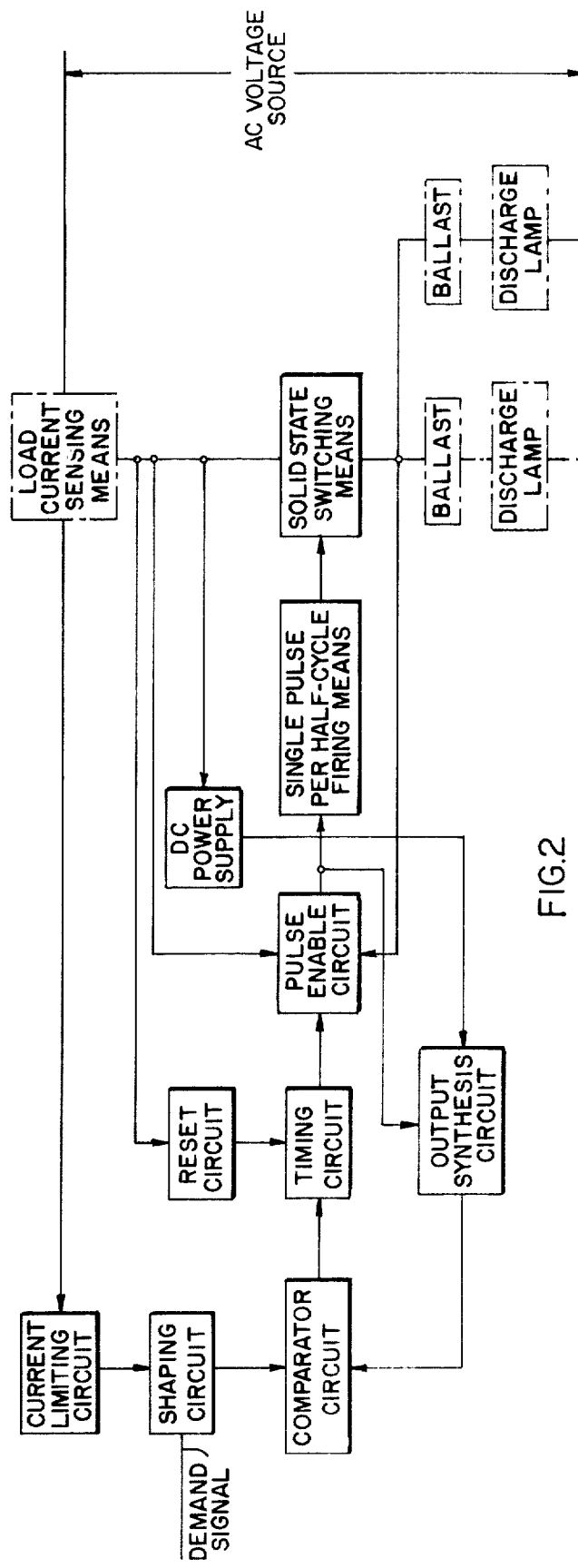
FIG. 2 is a block diagram of a preferred configuration and in which the load comprises ballasted discharge lamps.

FIG. 2 shows a preferred configuration, and includes additional elements, and is shown in conjunction with a discharge lamp load (which load can comprise one or more ballasted discharge lamps). A pulse enable circuit is used to prevent premature initiation of the single pulse per half cycle firing means as described in the aforementioned copending application. The reset circuit is used to initialize the timing of circuit each half cycle, preferably when the voltage of the A.C. source passes through zero. A load current sensing means, typically a current transformer, is used to send back a signal to a current limiting circuit. Upon overload the current limiting circuit transmits a signal to the shaping circuit which modifies the shaped demand signal such that the output power is reduced and the dimmer is not operated above the capacity of its solid-state switching means. The discharge lamps can be of various types, including high pressure mercury lamps or fluorescent lamps. The preferred configuration can also be used for an incandescent lamp load, in which case the pulse enable circuit is unnecessary and may be omitted. The operation of the preferred reset, shaping, timing and comparator (together with RMS computing) circuits is described in the aforementioned U.S. Pat. No. 3,821,601.

Figure 3:
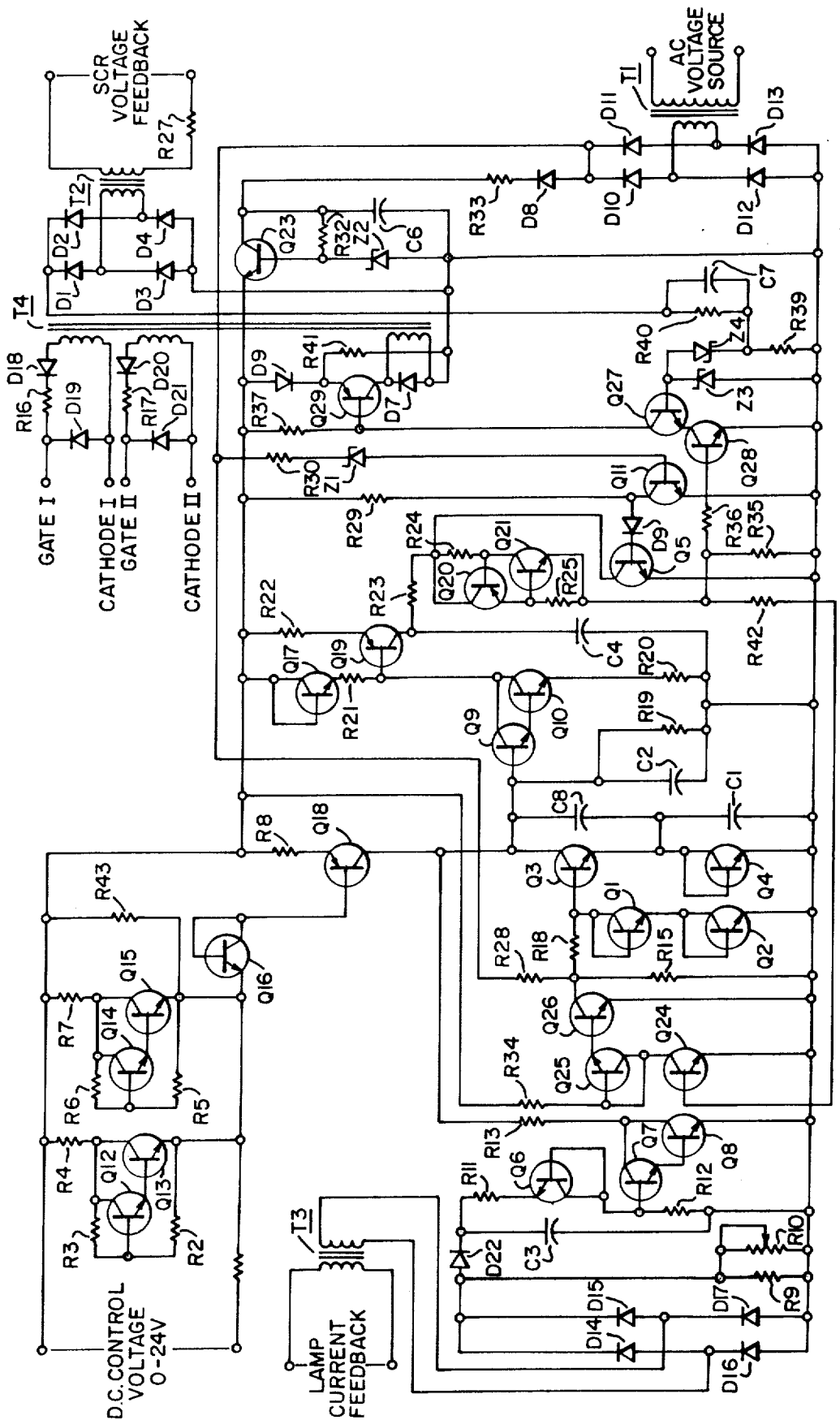
FIG. 3 is a detailed circuit diagram of a preferred configuration.

FIG. 3 is a detailed circuit diagram of a 7.2 kv dimmer which includes the instant invention. Table 1 is a component listing for this circuit:

TABLE I

| Reference Identification | Component Value |
|---|---|
| R1, R3, R16, R33 | 10k at ¼ watt |
| R2, R25 | 160k at ¼ watt |
| R4 | 1.8 meg at ¼ watt |
| R5 | 620k at ¼ watt |
| R6, R21 | 8.2k at ¼ watt |
| R7 | 560k at ¼ watt |
| R8 | 470k at ¼ watt |
| R9, R34, R43 | 100k at ¼ watt |
| R10, R35 | 20k at ¼ watt |
| R11 | 1.6 meg at ¼ watt |
| R12, R24 | 30k at ¼ watt |
| R13 | 3k at ¼ watt |
| R14 | 620 ohm at ¼ watt |
| R15, R32, R41 | 27k at ¼ watt |
| R17 | 200 ohm pot |
| R18 | 50k ohm pot |
| R19 | 82 ohm at ¼ watt |
| R20, R29 | 330 ohm at ¼ watt |
| R22, R23, R28 | 4.7k at ¼ watt |
| R27, R36, R42 | 1.5k at ¼ watt |
| R26 | 75 ohm at ¼ watt |
| R40 | 47k at ¼ watt |
| R30 | 43k at ¼ watt |
| R31 | 1 meg at ¼ watt |
| R37, R38 | 1k at ¼ watt |
| R39 | 15k |
| C1 | 0.68 ufd at 100 volts |
| C2 | 5.0 ufd at 50 volts |
| C3 | 0.15 ufd at 100 volts |
| C4 | 0.33 ufd at 100 volts |
| C5 | 125 ufd at 50 volts |
| C7 | WMF .0056-200 |
| D1 through D4 | 1N4148 |
| D5 through D13 | 1N457A |
| D14 through D22 | 1N645A |
| Q1 through Q6 | on single chip Silicon General SG3823 |
| Q12 through Q17 | on single chip Silicon General SG3823 |
| Q7 through Q11 | on single chip Silicon General SG3821 |
| Q18, Q19, Q20 | 2N2905A |
| Q21, Q22 | 2N711 |
| T1 | Stancor P-8394 |
| T2, T3 | Stancor P-8610 |
| T4 | Sprague 11 Z 2100 1:1:1 |
| Z1 | 1N756A |
| Z2 | 1N968B |
| Z3 | ¼ M 4.7A Z 5 |
| Z4 | 1N957B |
| Reactor | 0.71 millihenry choke |

The A.C. voltage waveform coupler R28 has its input connected to the unfiltered voltage of the D.C. power supply, and its output connected to the waveform switching means Q26. The timing signal coupler is provided by R42, Q24, and Q25. Before the solid-state switching means is triggered, the voltage across R15 (the output of the output synthesis circuit which goes to the comparator) should be zero and at this time Q25 and Q26 are conducting. The triggered signal from the timing circuit goes through R42 and turns on Q24 which turns off Q26 and allows a signal proportional to the A.C. power supply signal (and therefore proportional to the signal across the load) to be developed across R15 (with Q26 off, the voltage is divided between R28 and R15, a two to one resistor divider). Thus the signal sent to the comparator circuit is proportional to and has the rectified waveshape of the voltage across the load.

While the invention has been explained by describing particular embodiments thereof, it will be apparent to those skilled in the art that modifications may be made without departing from the scope of the invention.

What is claimed is:

1. A lighting control apparatus responsive to an electrical demand signal to control the portion of the voltage cycle during which the voltage is supplied to a lamp load from an A.C. voltage source; said apparatus comprising:
    a. solid-state switching means adapted to be connected in series with said load across said A.C. voltage source;
    b. a firing means having an output connected to said solid-state switching means, which firing means renders said solid-state switching means conductive when said firing means is initiated;
    c. a timing circuit connected to said firing means for initiating said firing means;
    d. a comparator circuit having first and second inputs and having an output connected to said timing circuit, the signal at said comparator output being effective to adjust said timing circuit in response to the difference between the signals on said inputs of said comparator circuit;
    e. a shaping circuit having an output connected to said first input of said comparator circuit, said shaping circuit being adapted to receiving said demand signal and to generating an output signal which is a function of said demand signals; and
    f. an output synthesis circuit having an output connected to said second input of said comparator circuit, said output synthesis circuit having a first input connected to the output of said timing circuit and a second input connected to the A.C. voltage source, said output synthesis circuit including means for generating an output signal which is essentially zero during that portion of the voltage cycle which said timing circuit has not initiated said firing means and which is a function of said A.C. voltage source during that portion of the voltage cycle which said timing circuit has initiated said firing means.

2. The apparatus of claim 1, wherein said output synthesis circuit comprises:
    an A.C. voltage waveform coupler having an input and an output, said waveform coupler input being connected to said A.C. voltage source,
    a waveform switching means having a first and second input and an output, said first input being connected to said output of A.C. voltage source waveform coupler and said waveform switching means output being connected to said comparator circuit, and
    a timing signal coupler having an input and an output, said signal coupler input being connected to the output of said timing circuit and said signal coupler output being connected to said second input of waveform switching means.

3. The apparatus of claim 2, wherein a D.C. power supply is included, said D.C. power supply having an intermediate terminal, said power supply rectifying said A.C. voltage to produce an unfiltered-rectified waveform at said intermediate terminal and then filtering said rectified A.C. voltage to provide D.C. power for said lighting control apparatus, and whereby said A.C. voltage waveform coupler is a resistor, said resistor being connected to said A.C. voltage source by being directly connected to said intermediate terminal of said D.C. power supply.

4. The apparatus of claim 3, wherein said lamp load comprises one or more ballasted discharge lamps.

5. The apparatus of claim 4, wherein said discharge lamps are fluorescent lamps.

* * * * *